United States Patent [19]

Jelks

[11] 4,244,037

[45] Jan. 6, 1981

[54] TWO DIMENSIONAL IMAGING USING SURFACE WAVE ACOUSTIC DEVICES

[75] Inventor: Edward C. Jelks, San Diego, Calif.

[73] Assignee: The United States of America as represented by the Secretary of the Navy, Washington, D.C.

[21] Appl. No.: 41,113

[22] Filed: May 21, 1979

[51] Int. Cl.[3] .......... G01S 3/84

[52] U.S. Cl. .......... 367/121; 343/100 SA; 333/150

[58] Field of Search .......... 367/7, 103, 118, 119, 367/121, 123, 135; 343/100 SA; 333/150, 154

[56] References Cited

U.S. PATENT DOCUMENTS

| | | | |
|---|---|---|---|
| 3,875,550 | 4/1975 | Quate | 367/7 |
| 3,953,825 | 4/1976 | Kino et al. | 367/7 |
| 4,065,736 | 12/1977 | London | 333/154 |

*Primary Examiner*—Richard A. Farley
*Attorney, Agent, or Firm*—Richard S. Sciascia; Ervin F. Johnston

[57] ABSTRACT

An apparatus is provided for processing the outputs of a two dimensional planar array of spaced apart receiving elements. The receiving elements are grouped and spaced apart in rows, which may be horizontal and vertical however, the rows may be in other directions provided they lie within a plane. The apparatus includes a plurality of surface acoustic wave (SAW) devices, each SAW device corresponding to a respective horizontal row of receiving elements and being capable of producing a plurality of horizontal phase shift outputs which linearly correspond to the number and horizontal spacing of receiving elements in a respective horizontal row. An additional SAW device is connected to the horizonatal SAW devices for introducing a vertical phase shift factor in the horizontal outputs of each horizontal SAW device so that each SAW device is capable of producing a plurality of combined phase shift outputs, the vertical phase shift factor corresponding linearly to the spacing of the receiving elements in a vertical direction. The apparatus further includes a mixer which corresponds to each horizontal SAW device for mixing the combined phase shift outputs with the respective outputs of the receiving elements in a respective horizontal row so as to produce a plurality of mixed output signals. If desired, the mixed output signals may be summed, processed by an upper sideband filter, and then fed to a video device. With proper controls of the horizontal and vertical scans of the video device two-dimensional imaging can be accomplished for indicating the direction and amplitude distribution of a radiating source with respect to the planar array of listening elements.

With the present invention the beamforming is independent of the center frequency of the receiving element array from 5 KHZ up to the millimeter frequency range.

9 Claims, 6 Drawing Figures

PLANAR ARRAY OF LISTENING ELEMENTS

TWO DIMENSIONAL IMAGING USING SURFACE WAVE ACOUSTIC DEVICES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an apparatus for processing the outputs of a two-dimensional planar array of spaced apart receiving elements where the receiving elements are grouped in spaced apart rows. This processing enables two-dimensional imaging of a far field radiating source with respect to the planar array.

Beamforming can be accomplished with a linear array of receiving elements, such as passive hydrophones. Beamforming is accomplished by providing an appropriate delay or phase shift to the outputs from the receiving elements so as to obtain a maximum summation thereof. This is called steering the beam, and will provide information on the direction of a target with respect to the linear array of listening elements. A basic patent on the delay line technique for beamforming is illustrated in the patent to G. W. Dewitz, U.S. Pat. No. 3,037,185.

Two dimensional imaging is in essence simultaneous beamforming in two directions, these directions normally being perpendicular with respect to one another. With such an arrangement the receiving elements must also be arranged in a two dimensional fashion, such as a plurality of rows of receiving elements within a common plane. Two dimensional imaging provides additional information over simple linear array beamforming. Simple linear array beamforming does not provide the exact direction to the sound source, but in contrast only provides a planar direction thereto. Two dimensional imaging provides information which indicates the exact direction of the radiating source from the planar array. The only information lacking in the two dimensional array, in regard to the exact location of the radiating source, is the range to the radiating source from the planar array.

Numerous imaging systems exist for the various segments of the electromagnetic or acoustic spectrum. Prior art imaging systems utilized in the microwave and millimeter region are usually not suitable for real time imaging. Further, these systems typically involve cumbersome mechanical scanning of aperture antennas. Another approach is the existing phased array method. Unfortunately, these methods normally require extensive numerical calculations or complex filtering and therefore are quite costly. In general, the prior art imaging systems are bulky, expensive to construct, and many do not provide real time information.

SUMMARY OF THE INVENTION

The present invention provides a two-dimensional imaging apparatus for processing the outputs of a two-dimensional planar array of spaced apart receiving elements, such as hydrophones or antennas. The receiving elements are grouped in spaced apart rows which may be oriented in horizontal and vertical directions. The present two-dimensional imaging apparatus is very compact, inexpensive to construct, and will result in the provision of real time two-dimensional imaging. The apparatus includes a plurality of surface acoustic wave (SAW) devices, each SAW device corresponding to a respective horizontal row of receiving elements and being capable of producing a plurality of horizontal phase shift outputs which linearly correspond to the number and horizontal spacing of receiving elements in a respective horizontal row. An additional SAW device is connected to the horizontal SAW devices for introducing a vertical phase shift factor in the horizontal outputs of each horizontal SAW device so that each SAW device is capable of producing a plurality of combined phase shift outputs, the vertical phase shift factors corresponding linearly to the spacing of the receiving elements in a vertical direction. The two-dimensional imaging apparatus may further include a mixer which corresponds to each horizontal SAW device for mixing the combined phase shift outputs with the respective outputs of the receiving elements in a respective horizontal row so as to produce a plurality of mixed output signals. If desired, a summer may be provided for summing the mixed output signals from all of the mixers so that the summation of the mixed output signals can be fed via an upper sideband filter to a video device. With proper control of the horizontal and vertical scans of the video device two-dimensional imaging can be accomplished for indicating the direction of the radiating source with respect to the planar array of receiving elements. With the present invention the beamforming is independent of the center frequency of the receiving element array from about 5 KHZ up to the millimeter frequency range.

OBJECTS OF THE INVENTION

An object of the present invention is to provide an apparatus for processing the outputs of a two-dimensional planar array of spaced apart receiving elements.

Another object is to provide a two-dimensional imaging apparatus for processing the outputs of a two-dimensional planar array of spaced apart receiving elements.

A further object is to provide a very compact, inexpensive, and efficient apparatus for real time processing of outputs from a two-dimensional planar array of spaced apart receiving elements.

Still another object is to provide a real time two-dimensional apparatus which utilizes SAW devices for processing the outputs of a two-dimensional planar array of spaced apart receiving elements where the receiving elements are arranged in spaced apart rows.

These and other objects of the invention will become more readily apparent from the ensuing specification when taken together with the drawings.

DESCRIPTION OF THE PREFERRED EMBODIMENT

Figure 1:
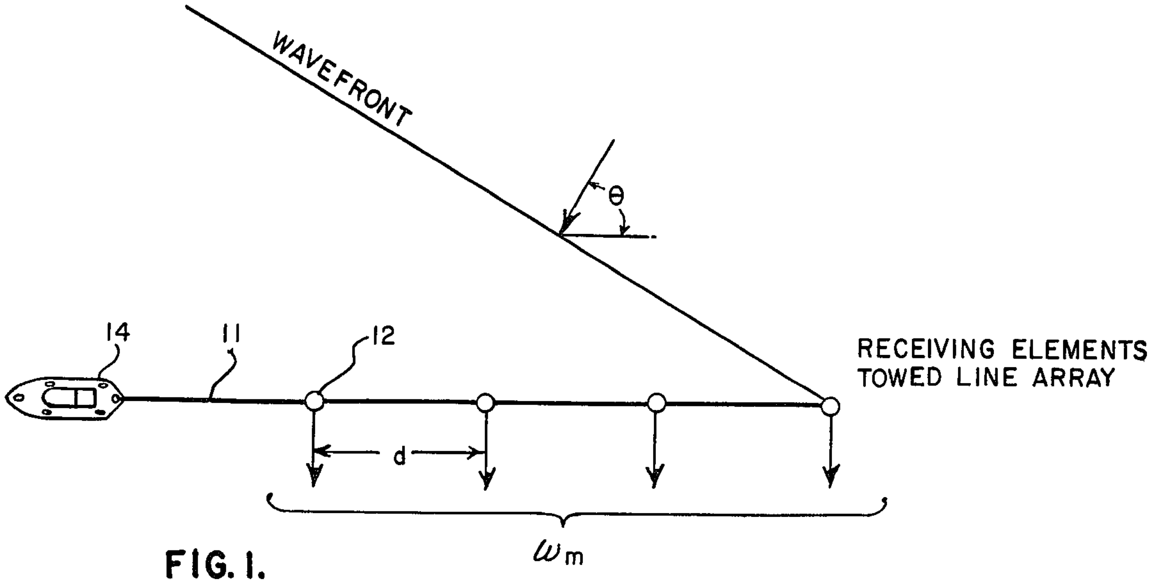
FIG. 1 is a plan view of a surface ship towing a linear array of receiving elements which are being subjected to an acoustic wavefront.
Figure 5:
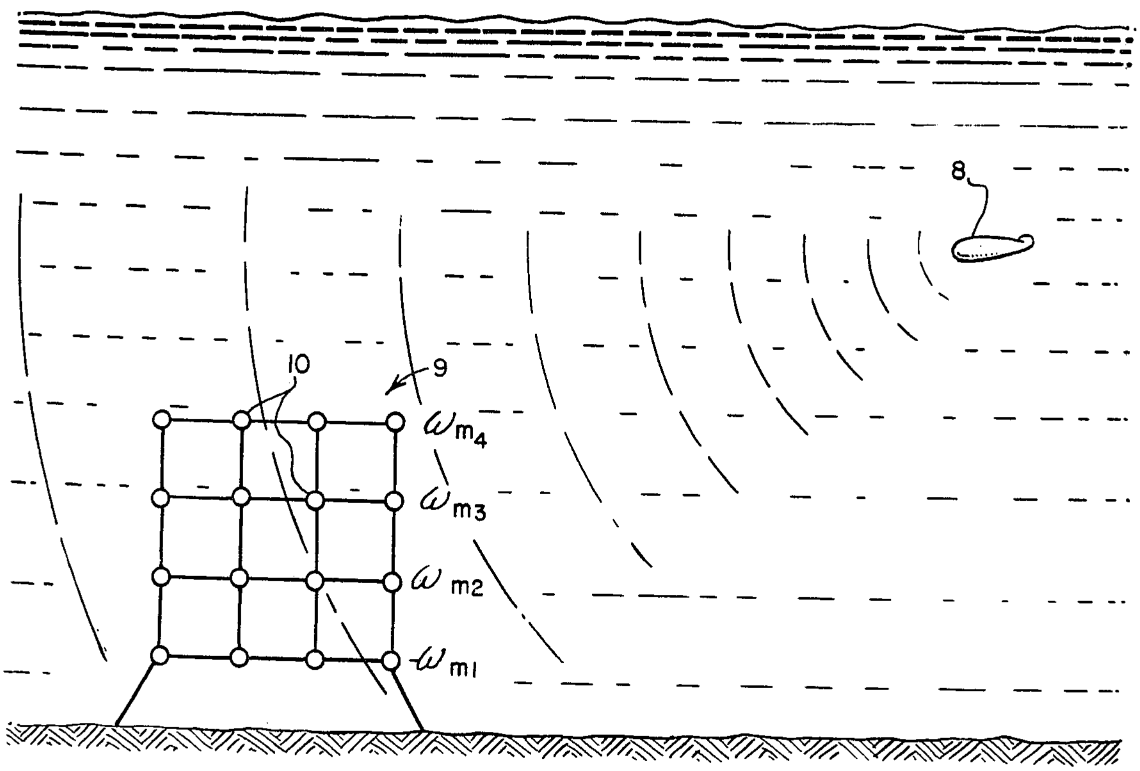
FIG. 5 is a schematic illustration of a planar array of receiving elements being subjected to a wavefront from a far field sound source in the ocean.
Figure 6:
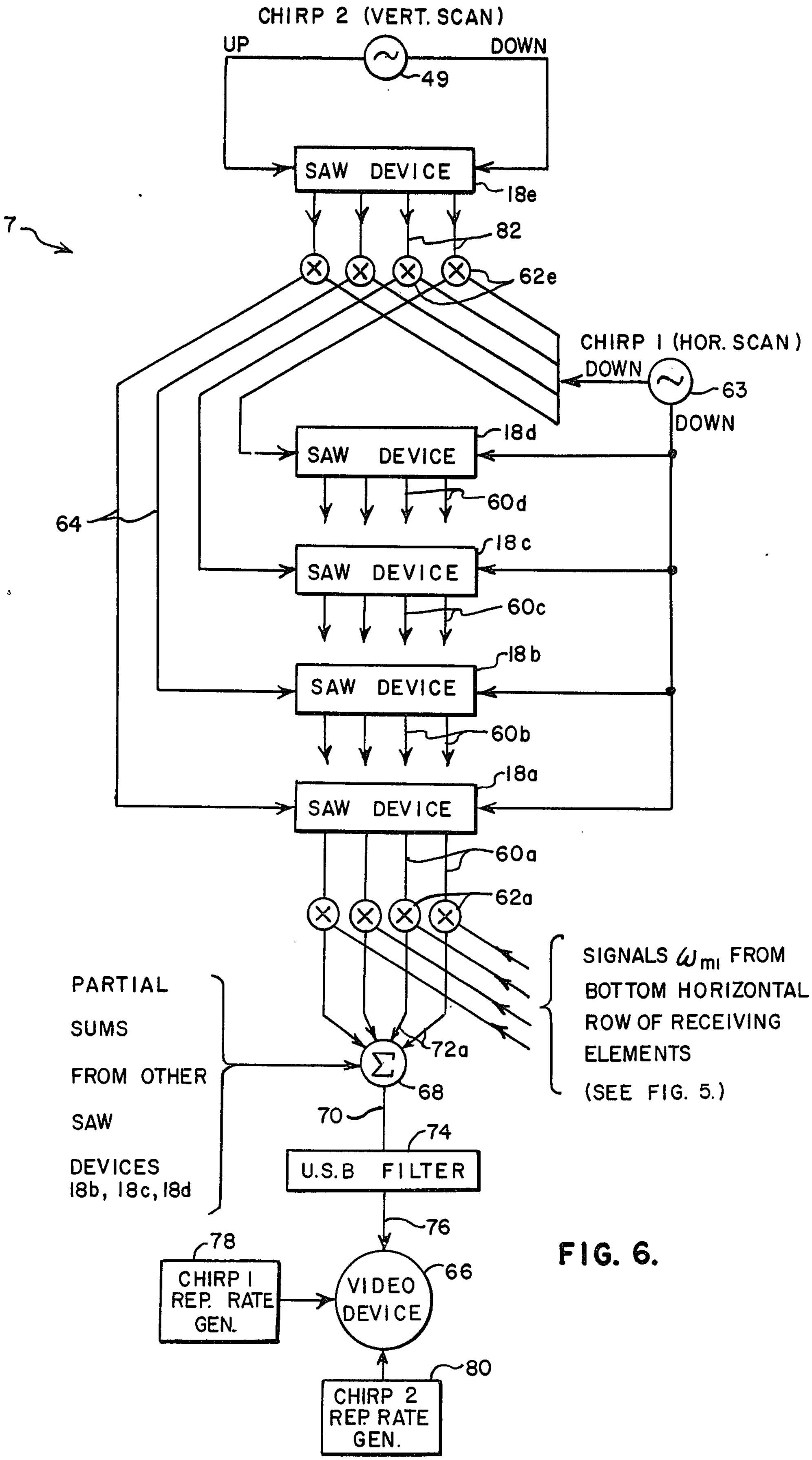
FIG. 6 is a schematic illustration of the present invention utilizing components illustrated in FIGS. 2 and 3.

Referring now to the drawings wherein like reference numerals designate like or similar parts throughout the several views there is illustrated in FIG. 6 the present invention which is a two-dimensional imaging apparatus 7. This apparatus is capable of real time two-dimensional imaging of a radiating source 8, such as sound, with respect to a planar array 9 of receiving elements 10, such as hydrophones, as illustrated in FIG. 5. The present invention, which is illustrated in FIG. 6, requires the components illustrated in FIGS. 2 and 3 which are components for performing a simple linear array beamforming function on a linear array 11 of receiving elements 12, as illustrated in FIG. 1. The receiving elements 12, which may be hydrophones, are pulled in a towed fashion by a surface ship 14. Since the components of the linear array beamforming apparatus, illustrated in FIGS. 2 and 3, are building blocks of the present invention, illustrated in FIG. 6, the linear array beamforming apparatus will be described first along with its mathematical analysis.

The arrangement in FIG. 1 is referred to as a towed line array and may utilize passive hydrophones 12 which are equally spaced from one another. FIG. 1 also illustrates an acoustic wavefront which has emanated from a far field target (not shown). The direction to the far field target, which is normal to the wavefront, with respect to the line array 11 is designated as $\theta$ for a purpose to be described hereinafter. With proper processing of the signals $\omega_m$ received by the receiving elements 12, beamforming can be accomplished so as to ascertain the direction of the far field target which is emanating the acoustic wavefront shown in FIG. 1.

Figure 2:
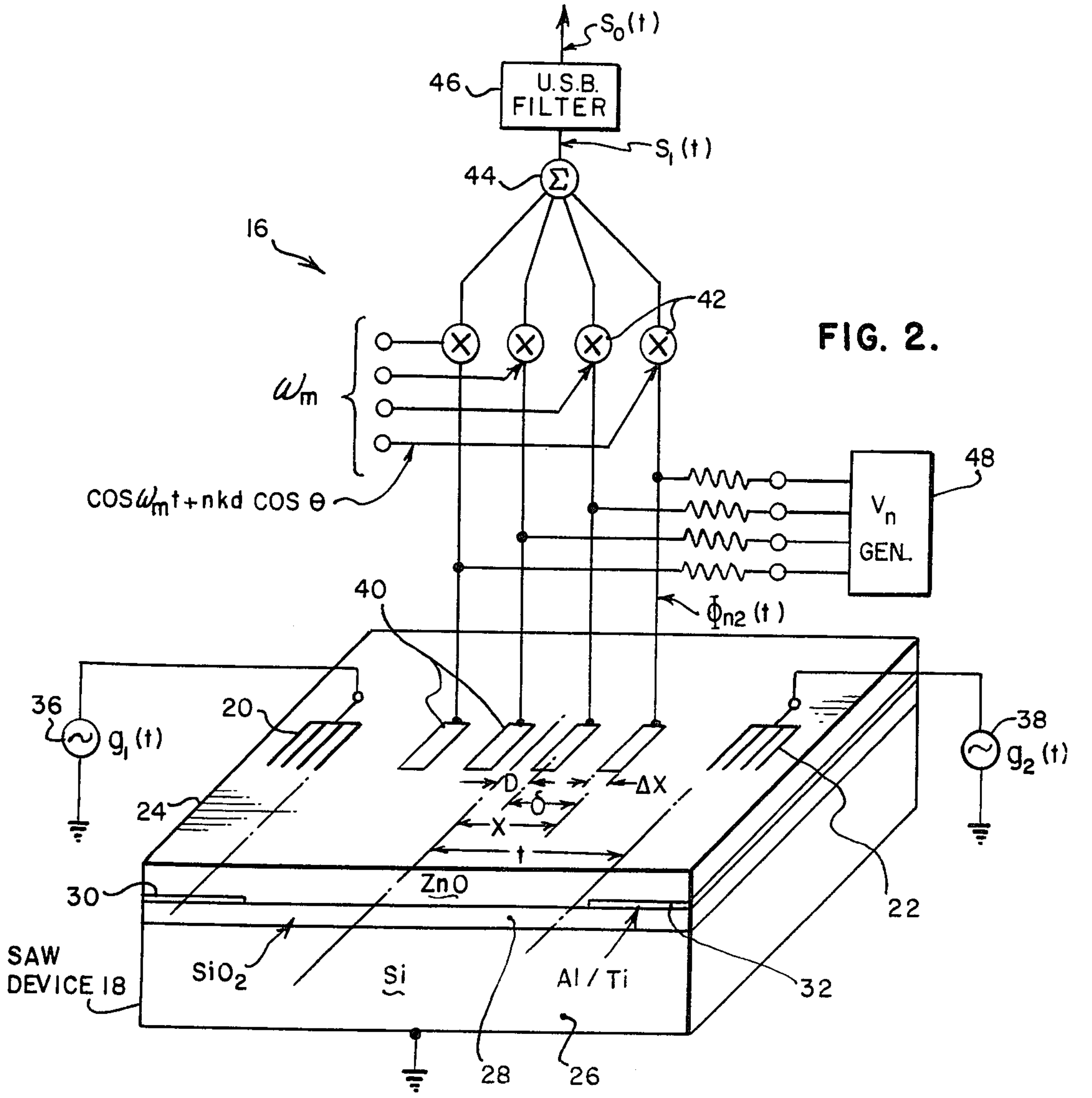
FIG. 2 is a schematic illustration of a surface acoustic wave device for processing signals $\omega_m$ from the receiving elements.
Figure 3:
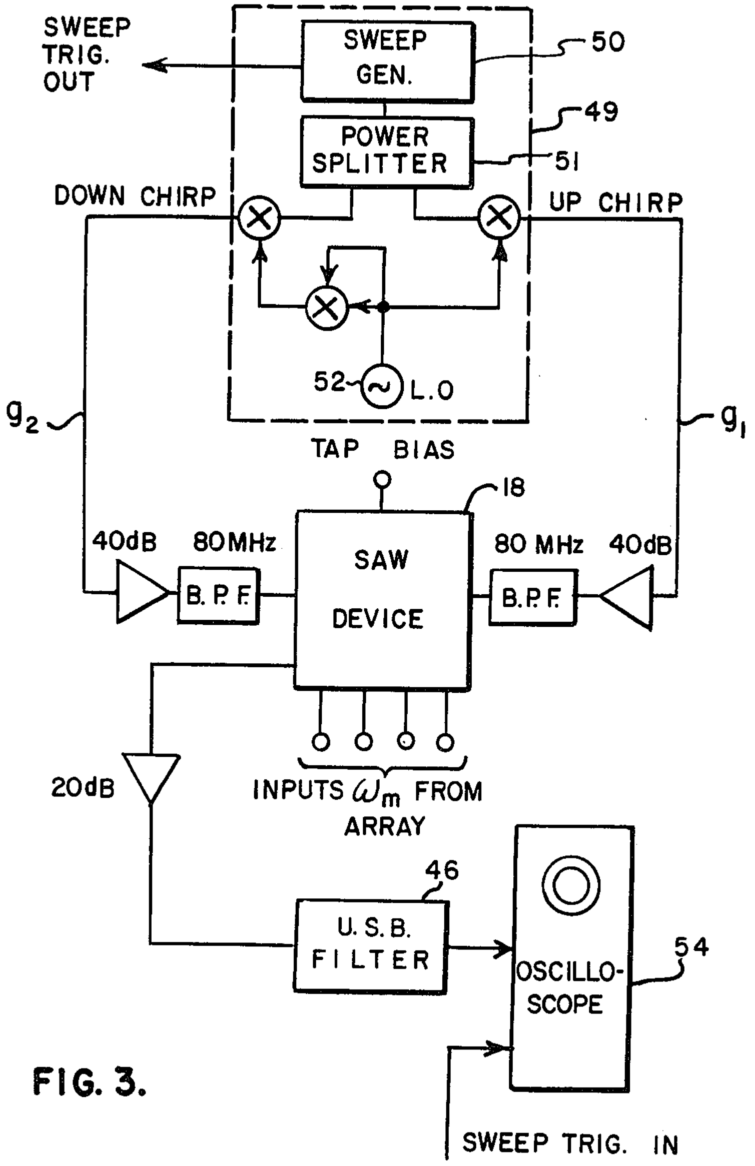
FIG. 3 is a schematic illustration of elements in block form for performing a simple linear array beamforming function.

The apparatus 16 illustrated in FIG. 2 is a beamformer for processing the outputs $\omega_m$ of the linear array 11 of spaced apart receiving elements 12 shown in FIG. 1. The beamforming apparatus 16 includes a surface acoustic wave (SAW) device 18 which has a pair of transducers 20 and 22 which are mounted on a substrate 24 in a spaced apart relationship. The substrate 24 may include a silicon base 26 which has a thermally grown silicon dioxide layer 28 which may be of thickness of 2000 A. Aluminum/titanium layers 30 and 32 may be deposited on the layer 28 in a spaced apart relationship. On top of the silicon dioxide 28 and the aluminum/titanium layers 30 and 32 there may be deposited a film 34 of zinc oxide approximately 1.6 microns in thickness. The transducers 20 and 22, which may be deposited on the zinc oxide layer 34 directly over the layers 30 and 32 respectively, include a plurality of spaced apart fingerlike electrodes which are joined in parallel to signal generators 36 and 38 respectively. The fingerlike electrodes of the transducers may be spaced approximately 20 microns apart in a sufficient number to establish a center frequency of 80 MHZ. The signal generators 36 and 38 generate chirp signals $g_1$ and $g_2$, both of these signals having a starting frequency of 80 MHZ, the difference between the chirp signals being that $g_1$ is of up slope and $g_2$ is of a down slope, $g_1$ can start at 80 MHZ and end at 80.4 MHZ while $g_2$ can start at 80 MHZ and end at 79.6 MHZ. Both signals are linear FM chirps. With this arrangement each transducer 20 and 22 is capable of receiving and converting a respective chirp signal into an acoustic signal so that the acoustic signals from both transducers are propagated toward one another across the surface of the SAW device 18.

A plurality of taps 40 are mounted on the surface of the substrate 24 between the pair of transducers 20 and 22 so as to be capable of receiving, squaring and converting the acoustic signals back into electrical signals. The number of taps 40 corresponds to the number of receiving elements 12 and should be spaced in a proportionate relationship. In the exemplary embodiment the receiving elements 12 are equally spaced, which means that the taps 40 would also be equally spaced in order to maintain the proper relationship.

Means, such as multipliers 42, are provided for mixing the signal from each tap 40 with a signal $\omega_m$ from a respective receiving element 12 so as to produce a plurality of mixed output signals. Means, such as a summer 44, is provided for summing the mixed output signals so as to provide a summed output signal, $S_1(t)$. The summed output signal may be processed by an upper sideband filter 46 so as to provide a final output signal, $S_o(t)$.

In order to accomplish amplitude shading, means, such as a multiple voltage generator 48, may be provided for generating a plurality of bias voltages $V_n$. Each tap 40 is connected to the bias voltage generator 48 for receiving a respective bias voltage. By varying the voltages on the generator 48 the output of any tap 40 can be varied so as to correspondingly vary the mixed output signal from the respective multiplier 42.

The method of the linear array beamformer includes propagating a pair of acoustic waves toward one another on the surface of a SAW device, such as the device 18 illustrated in FIG. 2; tapping the SAW device in the wavepath at spacings which are proportional to the spacing of the receiving elements; mixing the signal from each tap with a respective signal from the receiving elements so as to provide a plurality of mixed output signals and summing the mixed output signals to provide a summed output signal. An upper sideband of the summed output signal may then be extracted for controlling a video device.

Figure 4:
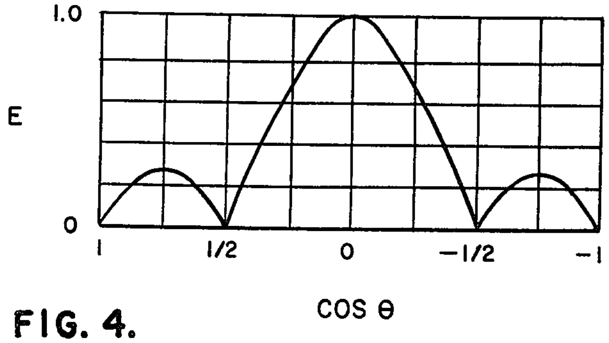
FIG. 4 is a graph illustration of the signal output of the beamforming apparatus of FIG. 3 as the apparatus is steered through various directions.

A mockup of the linear array beamforming apparatus is illustrated in FIG. 3 where the SAW device is shown at 18. An up and down linear FM chirp generator 49 is provided which includes a sweep generator 50 for generating an FM chirp and a power splitter 51. The FM chirp is mixed with the fundamental and the second harmonic frequencies of a local oscillator 52 to produce the up and down chirps, $g_1$ and $g_2$ respectively, each of which has a starting frequency of 80 MHZ. The two chirp signals are fed into the input transducers on the SAW device 18 to generate time varying phase shifts at each tap thereon. The signal $\omega_m$ from each array element is mixed with the corresponding phase shift generated at each tap and is then summed with all of the other outputs. This summation signal is then fed to the upper sideband filter 46, which in the mock-up was a 30 KHZ bandwidth filter. The output of the filter 46 was then presented on a scope 54 which produced a detected output as illustrated in FIG. 4. This was the result of utilizing a simulated array input of four 200 KHZ signals applied to the SAW device 18. This simulated a far field point source in a direction normal to the line 12 of the array. As can be seen from FIG. 4, the maximum signal is at "0" for a target normal to the line array. This approach is in effect a method of calibrating the apparatus. For a target which is not normal to the line array, the maximum signal will be to the left or right of the "0" mark so as to indicate instantaneously the bearing of the target from the line array. The number of receiving elements 12 and taps 40 may be increased if greater resolution is desired.

MATHEMATICAL ANALYSIS

The basic building block used in the aforementioned beamformer apparatus is the zinc oxide-on-silicon delay line illustrated schematically in FIG. 1. As stated hereinabove, signals $g_1(t)$ and $g_2(t)$ are applied to transducers 20 and 22, respectively. The transducers generate surface acoustic waves across the SAW device 18 that propagate under the taps 40 in the center of the device. Electric fields proportional to the amplitude of the signals $g_1(t)$ and $g_2(t)$, accompany the surface acoustic waves and extend into the depletion regions under each biased tap 40. The potential on the $n^{th}$ tap is given by $$\Phi_n(t) = \int_{D+n\delta-\frac{\Delta x}{2}}^{D+n\delta+\frac{\Delta x}{2}} B(V_n)\, g_1\left(t-\frac{x}{v}\right) g_2\left(t+\frac{x}{v}\right) dx,$$

where:

v=the SAW velocity, $B(V_n)$=a proportionality constant that depends on the tap bias voltage $V_n$, δ=the tap spacing, ΔX=the tap width, D=the distance between the center of the device and the middle of the first tap, x=distance from the center of the device and t=time from the center of the device. If the center frequencies of transducers 20 and 22 are the same and if $g_1(t)$ and $g_2(t)$ are linear FM chirps of opposite slope, the second harmonic potential on the $n^{th}$ tap is given by $$\Phi_{n2}(t) = \frac{B(V_n)}{2} \int_{D+n\delta-\frac{\Delta x}{2}}^{D+n\delta+\frac{\Delta x}{2}} \cos\left[2\omega_o t - \frac{\mu 4x}{v} t\right] dx,$$

where:

$\omega_o$=the starting frequency of the FM chirp, and

μ=the chirp rate. The signal from the $n^{th}$ array element, arising from a plane wave of frequency $\omega_m$ incident on the array, is now mixed with the $n^{th}$ tap output signal $\Phi_{n2}(t)$ and all n outputs are summed, giving $$S_1(t) = \sum_n (\cos \omega_m t + nkd\cos\theta)\, \Phi_{n2}(t),$$

where:

d=the array element spacing,

θ=the angle between the far field target direction and the line of the array and k=2π/λof listening array. When only the upper sideband of this signal is extracted, the final detected output is $$S_o(t) = \frac{\sin\frac{2\mu t}{v}\Delta x}{\left(\frac{2\mu t}{v}\right)} \sum_n \frac{B(V_n)}{2} [\cos \omega_m t +$$

-continued $$nkd\cos\theta - \frac{4\mu t}{v}(D+n\delta)]$$

and for sufficiently small Δx, $$S_o(t) \approx \Delta x \sum_n \frac{B(V_n)}{2} [\cos \omega_m t + nkd\cos\theta - \frac{4\mu t}{v}(D+n\delta)].$$

Thus the SAW device serves to add to each of the array elements 14 a time-varying phase term of (4 μt/v) (D+nδ), which depends on the array element position. A proper choice of the value of the phase term thus allows electrical scanning of the array independent of the array center frequency $\omega_m$. Also, amplitude shading of the array is possible through the tap bias constant $B(V_n)$. The chirp bandwidth required to scan the receiving fields over 180 degrees is given by $$B_c = \frac{d}{\lambda}\,\frac{1}{2(\Delta t)},$$

where: λ is the wavelength in the array medium, and Δt is the time delay between adjacent SAW taps 40. The maximum allowable bandwidth of the array signals is determined by the chirp sweep time, the lower limit of which is set by the total propagation time across the delay line. For the case of d=λ/2 and array signal bandwidths of 30 KHZ, for example, typical chirp bandwidths are about 400 KHZ. The fractional bandwidth required for 80 MHZ transducers then is only 0.005, and consequently dispersion poses no problem for this application. At the expense of increased chirp bandwidth, closer tap spacing, and higher transducer center frequencies, array signal bandwidths of the order of 1 MHZ should be possible.

The apparatus of FIG. 3 is especially adapted for narrowband beamforming purposes. If the signals from the receiving elements 12 are broadband, it may be necessary to perform temporal analysis on each array element signal before it it entered into the SAW device. This may be accomplished by a broadband beamforming scheme, such as that proposed by Speiser in his publication "Signal Processing Architectures Using Conventional Technology," Proceedings SPIE 22nd Annual International Technical Symposium, San Diego, Calif., 1978, 154, where a digital FFT or an analog of Fourier transform was utilized for performing the temporal analysis. The present apparatus of FIG. 3 can also be used in conjunction with detection systems other than passive hydrophones, namely: active sonar systems and radar systems.

PRESENT INVENTION

The present invention is illustrated in FIG. 6, and utilizes components which have been described hereinabove in FIGS. 2 and 3. The present invention is a two-dimensional imaging apparatus 7 which utilizes the two-dimensional planar array 9 of receiving elements 10, illustrated in FIG. 5. The array 9 of receiving elements may be mounted vertically on the ocean floor with the receiving elements 10 arranged in horizontal and vertical rows. The receiving elements 10, which may be hydrophones, may be equally spaced from one another, however, this is not essential in order to practice the present invention. Further, the array 9 may be oriented in other planes other than a vertical plane. In FIG. 5, a wavefront from a sound source 8 is shown traversing the array 9 of receiving elements. As described hereinbelow, the two-dimensional imaging system 7 of FIG. 6 is utilized to establish the two dimensional location of the noise source 8 with respect to the array 9. In order to accomplish this, signals from each horizontal row of receiving elements 10 are fed to the apparatus 7 for processing. These signals are set forth in FIG. 5 as $\omega_{ml}$, $\omega_{m2}$, $\omega_{m3}$ and $\omega_{m4}$.

The two-dimensional imaging apparatus 7, as illustrated in FIG. 6, includes a plurality of SAW devices, 18*a*, 18*b*, 18*c* and 18*d*, each SAW device corresponding to a respective horizontal row of receiving elements 10, illustrated in FIG. 5. Each SAW device is adapted to produce a plurality of horizontal phase shift outputs on output lines 60*a*–60*d* which linearly correspond to the number of and horizontal spacing of receiving elements 10 in a respective horizontal row, as can be seen in FIG. 5. As stated for the one-dimensional apparatus, shown in FIG. 2, the spacing of the taps (not shown in FIG. 6) of the SAW devices 18*a*, 18*b*, 18*c* and 18*d* are proportional to the horizontal spacing of the receiving elements 10 in each respective row, as illustrated in FIG. 5.

An additional SAW device 18*e* is connected to the horizontal SAW devices 18*a* through 18*d* for introducing a vertical phase shift factor in the horizontal phase shift outputs on lines 60*a* through 60*d* of each respective horizontal SAW device so that each SAW device is capable of producing a plurality of combined phase shift outputs on the lines 60*a* through 60*d*. The vertical phase shift factors correspond linearly to the spacing of the receiving elements 10 in FIG. 5 in a vertical direction. This means that the taps (not shown in FIG. 6) of the SAW device 18*e* in FIG. 6 are spaced proportionally to the vertical spacing of the receiving elements 10 in FIG. 5.

Means connected to each horizontal SAW device 18*a* through 18*d* are provided for mixing the combined phase shift outputs with the respective outputs of the receiving elements 10 in a respective horizontal row so as to produce a plurality of mixed output signals. Only one set of mixers 62*a* for the SAW device 18*a* is illustrated in FIG. 6. Identical sets of mixers are provided for the SAW devices 18*b* through 18*d*. The mixers 62*a* are connected to the lines 60*a* for receiving the combined phase shift outputs from the SAW device 18*a*, and are additionally connected to the bottom row of receiving elements 10, as illustrated in FIG. 5, for receiving the outputs $\omega_{m1}$ therefrom.

In order to operate the additional SAW device 18*e* for introducing the vertical phase shift factor into the horizontal SAW devices 18*a* through 18*d*, an additional set of mixers 62*e* is provided, each mixer 62*e* being interconnected between a respective tap (not shown) of the vertical SAW device 18*e* and a transducer (not shown) of a respective horizontal SAW device 18*a* through 18*d*. In addition, first and second signal generators 49 and 53 are provided, the signal generator 49 being identical to the generator 49 in FIG. 3 so as to be capable of generating a pair of linear FM chirp signals with the same center frequency, but of opposite slope, and the signal generator 63 including only the sweep generator 50 and power splitter 51 of FIG. 3 so that a pair of down slope chirps is provided. One of the down chirp signals from the signal generator 63 is fed to a respective transducer (not shown) of each of the horizontal SAW devices 18*a* through 18*d*, and the other down chirp signal of the signal generator 63 is fed to each of the additional mixers 62*e*. Each chirp signal of the signal generator 49 is fed to a respective transducer (not shown) of the vertical SAW device 18*e*. While the slopes of the chirp signals from the signal generator 49 are shown with notations "up" and "down" in FIG. 6, these slopes could be reversed depending upon the results desired on the video screen 66. The vertical phase shift factors or outputs from the set of mixers 62*e* are then fed via lines 64 to the respective transducers (not shown) of the horizontal SAW devices 18*a* through 18*d*. If desired, the mixed output signals from each SAW device 18*a* through 18*d* may be fed to a computer (not shown) for storage and processing as desired. However, in the preferred embodiment these mixed output signals are utilized for two-dimensional imaging on the video apparatus 66, as will be fully explained hereinbelow.

A summer 68 is provided for summing the mixed output signals from all of the mixers which correspond to the respective horizontal SAW devices 18*a* through 18*d* so as to produce a summed output on line 70. This is shown in detail for one of the SAW devices, namely SAW device 18*a*, where each of the mixers 62*a* dump their mixed output signals over lines 72*a* into the summer 68. The identical circuitry is provided for each of the other SAW devices 18*b* through 18*d* so that each of their mixers also dump their mixed output signals into the summer 68. The summed output from the summer 68 is fed into an upper sideband filter 74 via the line 70, and the upper sideband of the summed output from the upper sideband filter 74 is fed to the receiving circuitry of the video apparatus 66 via a line 76.

Means, such as a chirp 1 repetition rate generator 78, is provided for controlling the horizontal scan of the TV apparatus according to the chirp repetition rate of the first signal generator 63. In a like manner, means, such as a chirp 2 repetition rate generator 80, is provided for controlling the vertical scan of the video apparatus 66 according to the chirp repetition rate of the second signal generator 49. With this arrangement the sound source 8, of FIG. 5, will be indicated on the screen of the video apparatus 66 by a bright spot, which spot will indicate the two dimensional location of the sound source 8 with respect to the array 9 of receiving elements. The video apparatus 66 should be calibrated so that when a sound source is normal to the center of the array 9 of receiving elements the bright spot will be located in the center of the screen. This calibration can be accomplished by placing a sound source in such a location and making adjustments to assure that the bright spot is so positioned. With the sound source 8 positioned, as shown in FIG. 5, the bright spot would appear in the upper righthand corner of the screen of the video apparatus 66. If desired, a generator, like the generator 48 illustrated in FIG. 2, can be connected to the lines 60*a* through 60*d* and lines 82 in the same way as illustrated in FIG. 2, for shading purposes. Further, additional receiving elements 10, SAW devices 18, and taps may be employed if greater resolution is desired.

Obviously, many modifications and variations of the present invention are possible in the light of the above teachings, and it is therefore understood that within the scope of the disclosed inventive concept, the invention may be practiced otherwise than as specifically described.

I claim:

1. An apparatus for processing the outputs of a two dimensional planar array of spaced apart receiving elements where the receiving elements are grouped in spaced apart horizontal and vertical rows, said apparatus comprising:

a plurality of surface acoustic wave (SAW) devices, each SAW device corresponding to a respective horizontal row of receiving elements and being adapted to produce a plurality of horizontal phase shift outputs which linearly correspond to the number and horizontal spacing of receiving elements in a respective horizontal row;

an additional SAW device connected to the horizontal SAW devices for introducing a vertical phase shift factor in the horizontal outputs of each horizontal SAW device so that each SAW device is capable of producing a plurality of combined phase shift outputs, the vertical phase shift factors corresponding linearly to the spacing of the receiving elements in a vertical direction; and means connected to each horizontal SAW device for mixing the combined phase shift outputs with the respective outputs of the receiving elements in a respective horizontal row so as to produce a plurality of mixed output signals.

2. An apparatus as claimed in claim 1 including:

the substrate of the SAW device having a zinc oxide layer on a silicon/silicon oxide base.

3. An apparatus as claimed in claim 1 including:

a summer for summing the mixed output signals from all of the mixers; and an upper sideband filter for receiving the summed output and producing the upper sideband thereof.

4. An apparatus as claimed in claim 3 including:

first and second signal generators connected to the horizontal and vertical SAW devices respectively;

a video device connected to the upper sideband filter for receiving the upper sideband of the summed output;

means for controlling the horizontal scan of the video device according to the chirp repetition rate of the first signal generator; and means for controlling the vertical scan of the video device according to the chirp repetition rate of the second signal generator.

5. An apparatus as claimed in claim 1 including:

each SAW device having a pair of transducers mounted on a substrate in a spaced apart relationship, each transducer being capable of receiving and converting an electrical chirp signal into an acoustic signal for propagation across the surface of the SAW device;

a plurality of taps mounted on the substrate in a spaced apart relationship between said pair of transducers for operating in cooperation with the substrate to receive, square, and convert the acoustic signals back into electrical signals;

the spacing between the taps being proportionally matched to the spacing between the receiving elements; and each tap of the vertical SAW device being connected to a respective horizontal SAW device for introducing said vertical phase shift factor, and the taps of each horizontal SAW device being connected to a respective mixer.

6. An apparatus as claimed in claim 5 including:

additional mixers, each mixer being interconnected between a respective tap of the vertical SAW device and a respective horizontal SAW device;

first and second signal generators, each signal generator being capable of generating a pair of linear FM chirp signals with the same starting frequency, the chirp signals of the first signal generator being of opposite slope with respect to one another and the chirp signals of the second signal generator being of the same slope with respect to one another;

one of the chirp signals from the first signal generator being fed to a respective transducer of each of the horizontal SAW devices and the other chirp signal of the first signal generator being fed to each of said additional mixers; and each chirp signal of the second signal generator being fed to a respective transducer of the vertical SAW device.

7. An apparatus as claimed in claim 6 including:

a summer for summing the mixed output signals from all of the first mentioned mixers which correspond to the horizontal SAW devices so as to produce a summed output;

an upper sideband filter for receiving the summed output and producing the upper sideband thereof.

8. An apparatus as claimed in claim 7 including:

a video device connected to the upper sideband filter for receiving the upper sideband of the summed output;

means for controlling the horizontal scan of the video device according to the chirp repetition rate of the first signal generator; and means for controlling the vertical scan of the video device according to the chirp repetition rate of the second signal generator.

9. An apparatus as claimed in claim 8 including:

the substrate of the SAW device having a zinc oxide layer on a silicon/silicon oxide base.

* * * * *